US011273928B2

(12) United States Patent
Prosser et al.

(10) Patent No.: US 11,273,928 B2
(45) Date of Patent: Mar. 15, 2022

(54) TIME AVAILABLE BEFORE AIRCRAFT AUTO-RECOVERY BEGINS

(71) Applicant: Gulfstream Aerospace Corporation, Savannah, GA (US)

(72) Inventors: Kevin Prosser, Savannah, GA (US); Blake Finlayson, Savannah, GA (US); Abhishek Vaidya, Savannah, GA (US); Alborz Sakhaei, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 255 days.

(21) Appl. No.: 16/552,612

(22) Filed: Aug. 27, 2019

(65) Prior Publication Data

US 2020/0062417 A1    Feb. 27, 2020

Related U.S. Application Data

(60) Provisional application No. 62/723,234, filed on Aug. 27, 2018.

(51) Int. Cl.
    *G01C 21/34*      (2006.01)
    *B64D 45/00*      (2006.01)
    *G01C 23/00*      (2006.01)

(52) U.S. Cl.
    CPC ............. *B64D 45/00* (2013.01); *G01C 23/00* (2013.01)

(58) Field of Classification Search
None
See application file for complete search history.

(56) References Cited

U.S. PATENT DOCUMENTS

| | | | | |
|---|---|---|---|---|
| 4,839,658 A | * | 6/1989 | Kathol | ................. G08G 5/0013 342/455 |
| 5,488,563 A | * | 1/1996 | Chazelle | .............. G01C 21/005 701/301 |
| 5,566,074 A | | 10/1996 | Hammer | |
| 2009/0088972 A1 | * | 4/2009 | Bushnell | ................ G08G 5/045 701/414 |
| 2016/0318446 A1 | | 11/2016 | Van Steenkist et al. | |

OTHER PUBLICATIONS

US Department of Transportation, Federal Aviation Administration, Introduction to TCAS II Version 7.1, Feb. 28, 2011.

\* cited by examiner

*Primary Examiner* — Brent Swarthout
(74) *Attorney, Agent, or Firm* — LKGlobal | Lorenz & Kopf, LLP

(57) ABSTRACT

An avionics system for an aircraft includes a threat data structure and a processor. The threat data structure stores an alert threshold and a margin threshold. The processor is programmed to: predict an aircraft state at a plurality of positions along a potential future trajectory; calculate a margin value at each of the plurality of positions as a difference between the predicted future condition and the threat value at each respective one of the plurality of positions; calculate a margin rate of change at each of the plurality of positions based on a change in the margin value along the potential future trajectory; estimate a time to go value based on a minimum calculated margin value and a maximum calculated margin rate of change among the plurality of positions; and command an indicator to alert the pilot in response to the time to go value reaching the alert threshold.

20 Claims, 6 Drawing Sheets

TIME AVAILABLE BEFORE AIRCRAFT AUTO-RECOVERY BEGINS

CROSS-REFERENCE TO RELATED APPLICATION

This application takes priority under 35 U.S.C. § 229 (e) to U.S. provisional application Ser. No. 62/723,234, filed Aug. 27, 2018, titled Time Available During Recovery in Aircraft; the entire disclosure, drawings and appendices of which are incorporated herein by reference.

TECHNICAL FIELD

The present disclosure generally relates to aircraft flight envelope protection systems, and more particularly to aircraft flight envelope protection systems that estimates a time until the system initiates an auto-recovery for alerting the pilot to the potential auto-recovery initiation.

BACKGROUND

This section provides background information related to the present disclosure which is not necessarily prior art.

Aircraft are designed to operate within certain operating speeds and loads on control surfaces of the aircraft. These operating limits are known as the flight envelope, outside of which there may be damage or loss of control of the aircraft. Additionally, aircraft must operate over flight trajectories that avoid collision with material objects such as ground terrain and other aircraft. In order to protect against operating outside of the flight envelope or colliding with other objects, conventional aircraft utilize many disparate protection or safety systems that each evaluate individual aspects of the aircraft to determine whether the aircraft is operating outside of the flight envelope or is likely to collide with the ground or other objects on the present flight path.

After identification of a threat, these disparate protection or safety systems typically either initiate the recovery immediately or wait a specific amount of time before initiating recovery to give the pilot time to recover in a different fashion. Although these conventional methods are suitable for conventional systems, they may be improved.

SUMMARY

In a first non-limiting embodiment, an avionics system for an aircraft includes a threat data structure and a processor. The threat data structure stores an alert threshold and a margin threshold. The processor is programmed to: predict an aircraft state at a plurality of positions along a potential future trajectory; calculate a margin value at each of the plurality of positions as a difference between the predicted future condition and the threat value at each respective one of the plurality of positions; calculate a margin rate of change at each of the plurality of positions based on a change in the margin value along the potential future trajectory; estimate a time to go value based on a minimum calculated margin value and a maximum calculated margin rate of change among the plurality of positions; and command an indicator to alert the pilot in response to the time to go value reaching the alert threshold.

In a second non-limiting embodiment, an aircraft includes a threat data structure and a processor. The threat data structure stores an alert threshold and a margin threshold below which the avionics system will engage an autopilot recovery of the aircraft. The margin threshold indicates a difference limit between a predicted future condition and a threat value. The alert threshold indicates a predetermined amount of time the aircraft would preferably alert a pilot before engaging an autopilot. The processor is programmed to: predict an aircraft state at each of a plurality of positions along a potential future trajectory available to the aircraft; calculate a margin value (MGN) at each of the plurality of positions as a difference between the predicted future condition and the threat value at each respective one of the plurality of positions; calculate a margin rate of change (MGNdot) at each of the plurality of positions based on a change in the margin value along the potential future trajectory; estimate a time to go (TTG) value based on a minimum calculated margin value ($MGN_{MIN}$) and a maximum calculated margin rate of change ($MGNdot_{MAX}$) among the plurality of positions; and command an indicator to alert the pilot in response to the time to go value reaching the alert threshold.

In a third non-limiting embodiment, a method of alerting a pilot to an impending auto-recovery by an avionics system of an aircraft includes predicting an aircraft state at each of a plurality of positions along a potential future trajectory available to the aircraft. The method further includes calculating a margin value (MGN) at each of the plurality of positions as a difference between a predicted future condition and a threat value at each respective one of the plurality of positions. The method yet further includes calculating a margin rate of change (MĠN) at each of the plurality of positions based on a change in the margin value along the potential future trajectory. The method yet further includes estimating a time to go (TTG) value based on a minimum calculated margin value ($MGN_{MIN}$) and a maximum calculated margin rate of change ($MĠNdot_{MAX}$) among the plurality of positions. The method yet further includes commanding an indicator to alert the pilot in response to the time to go value reaching the alert threshold

BRIEF DESCRIPTION OF THE DRAWINGS

The drawings described herein are for illustrative purposes only of selected embodiments and not all possible implementations. Thus the particular choice of drawings is not intended to limit the scope of the present disclosure.

DETAILED DESCRIPTION

The following detailed description is merely exemplary in nature and is not intended to limit the invention or the application and uses of the invention. Furthermore, there is no intention to be bound by any theory presented in the preceding background or the following detailed description Introduction The disclosed aircraft flight envelope protection system uses flight path predictive techniques to provide unified, full-envelope protection, working across the entire spectrum of aircraft flight conditions to address a full spectrum of different types of hazards. Flight path predictions are computed continuously from the aircraft's current situation using a kinematic energy model. Plural predicted trajectories are calculated, each representing a different escape route that will avoid a hazard when the threshold or trigger point for that hazard is reached. The system respects different types of hazards, some dealing with innate aircraft properties, such as speed and altitude limits, and some dealing with external concerns, such as terrain and object avoidance. The disclosed aircraft flight envelope protection system is designed to work across all such threat envelope boundaries.

Although plural trajectories are calculated, the envelope protection system continually assesses, and deprecates trajectories that are not feasible in the aircraft's current situation. A deprecated trajectory is treated by the system as not viable, unless the aircraft's situation changes such that the deprecated trajectory again becomes viable. The disclosed protection system works in the background, and does not override or usurp the pilot's authority until only one viable predicted trajectory remains (all other predicted trajectories have been deprecated), and a threat is triggered. In this event, the protection system automatically deploys an autopilot mechanism to take evasive action to avoid the hazard condition. The protection system may also generate warnings to the pilot, but is preferably not dependent on the pilot to take recovery action once the one remaining viable trajectory reaches the trigger point.

Preferably, the predictive envelope protection system is configured to provide a non-binary spectrum of recovery actions, including a passenger-safe, soft-ride recovery at one end of the spectrum and a hard recovery at the other end of the spectrum. When required to avert imminent threat, the system triggers a hard recovery. However in less extreme situations, where there is more time to recover, the system triggers a soft recovery—a passenger comfort, smooth recovery. When such soft recovery is triggered the system will optionally blend input from the pilot into the recovery algorithm, allowing the pilot to modify the recovery aggressiveness based on the pilot's skill and experience.

Figure 1:
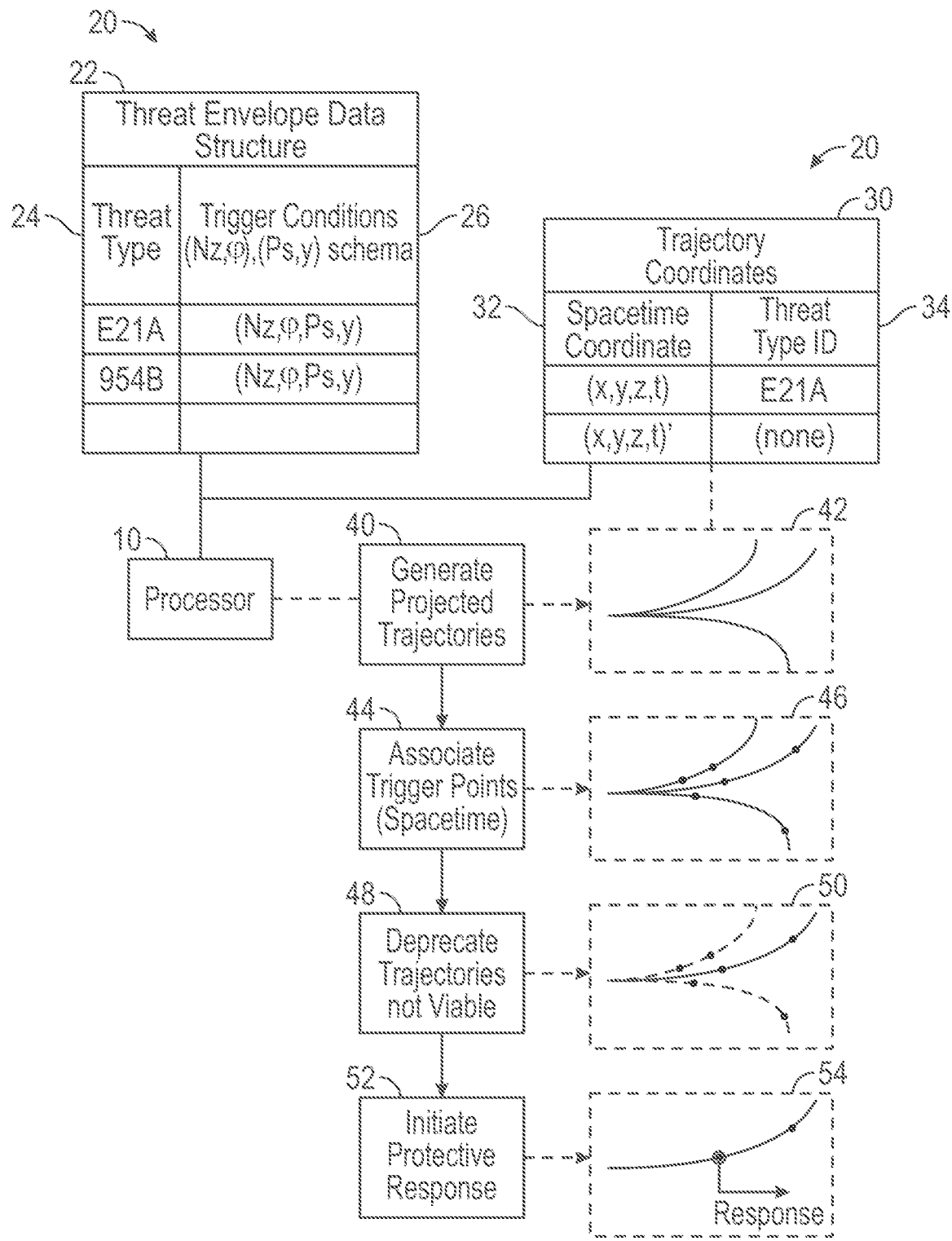
FIG. 1 is a block diagram illustrating the threat envelope and trajectory coordinates data structures, in conjunction with a processor programmed to performs steps to carry out the envelope protection function.

Referring to FIG. 1 an embodiment of the disclosed aircraft threat envelope protection system may be implemented using a processor 10 having an associated memory circuit 20 that is configured according to a predetermined threat envelope data structure 22 that stores a plurality of different types of threats associated with the aircraft 28. Preferably, the processor 10 and associated memory circuit 20 are carried by the aircraft. The data structure may comprise a table, list or matrix of records, each corresponding to a different threat type, shown in columnar form at 24 in FIG. 1. Each threat type 24 has a corresponding trigger condition stored at 26. These trigger conditions are parameterized using a common schema based on an n-dimensional threat space, and tell the processor 10 under what conditions the particular threat condition has been reached. Importantly, the common schema dimensions of the threat space are chosen so that a full spectrum of different threat conditions can be represented using a common, minimal set of fundamental variables. A presently preferred minimal set of fundamental variables is discussed below in the section titled Kinematic-Energy Model.

The memory circuit 20 is also configured to support a trajectory coordinates data structure 30 that stores plural trajectories in terms of the spacetime coordinate variables 32. For illustration purposes, the spacetime coordinate variables have been identified using a rectangular coordinate system (x, y, z, t). Other coordinate systems (e.g., spherical) may also be used.

Generating Projected Trajectories

The trajectory coordinates data structure is populated with a sequence of spacetime coordinate variables (separately for each projected trajectory being modeled) that lie on and thus define the recovery trajectory shape in spacetime. To illustrate, the processor 10 is programmed to perform the generate the projected trajectories step, at 40, which results in a plurality of projected recovery trajectories being defined in terms of the spacetime coordinates, as illustrated in the spacetime illustration at 42. Each projected trajectory is computed, taking the current state of the aircraft as the starting point and assuming that each recovery maneuver is initiated at that moment.

In the example illustrated here, three projected trajectories are generated by processor 10. For the remainder of this disclosure three projected trajectories will be illustrated. In a given implementation, different numbers of trajectories may be used to define the working set of plural trajectories. In a commercial or business jet aircraft, three projected trajectories will normally be suitable to support smooth, passenger comfortable recoveries from threats. For aircraft, such as military aircraft, that may be required to fly inverted or in close proximity to the nape of the earth, a larger number of projected trajectories may desirable.

There are different ways for the processor to determine the spacetime shapes of each of the plural trajectories. In one embodiment the trajectory spacetime shapes follow a standardized set of predefined solution curves, corresponding to a set of known hazard recovery maneuvers that are appropriate for the class of aircraft for which the protection system is designed. Typically these solution curves are based on what a trained pilot would likely fly to avoid the particular hazard. These might include, for example, a standard set of pull-up, dive, turn left and turn right maneuvers, where the specific parameters (e.g., climb and bank angles) are chosen to maximize passenger safety and comfort. In some implementations compound recovery maneuvers may be used, where different classes of maneuvers are concatenated together. For example, a business jet might employ a compound maneuver where a final climb maneuver is preceded by a zoom maneuver to exchange excess airspeed for altitude while capturing the optimum steady state climb. In this embodiment a standardized set of a relatively small number of predefined solution curves (e.g., three projected trajectories) is sufficient for many types of aircraft, including business jets. Working with a relatively small number of solution curves and a small number of fundamental kinematic-energy variables, places a minimal load on the processor. Because the trajectories are continually being recomputed, the system produces good results, even though the solution set has been reduced to only a few projected trajectories, based on a few fundamental variables. Of course, if higher resolution is required for a particular aircraft application, the processor can be programmed to compute a greater number of trajectories, and the calculations can be expanded to support additional variables. Parallel processing techniques and programmable gate array circuit components may be utilized to enhance or replace processor 10 if greater throughput is required.

As an alternative to generating projected trajectories from a small, standardized set of predefined solution curves, the processor can be programmed to select from a stored collection of different families of predefined solution curve sets, each family being designed for optimal recovery from a particular type or class of threat. Thus the solution curve family chosen for recovery from a stall hazard might be different from the solution curve family chosen for recovery from a service ceiling hazard. To assess which family of solutions to employ, the processor can project the current aircraft state onto the n-dimensional threat space to determine which threat family is most proximate to the current aircraft state. In so doing, the processor determines in real time which threat is most pressing and then bases the projected trajectory models on the family of predefined solution curves that is best suited under current circumstances.

Associating Threat Trigger Points to Each Potential Trajectory

Either in parallel as the trajectories are being generated, or serially after the trajectories have been generated, the processor, at step 44, associates applicable trigger points, corresponding to threats identified within the threat envelope data structure, to points in spacetime along each of the projected trajectories. For any given trajectory, initially there may be no detected threats. However, as the aircraft continues to fly and the trajectories are continually recomputed, at some point in time a threat may be detected and this threat (first detected in time) will be associated as a trigger point on each of the trajectories where applicable. As diagrammatically represented in the spacetime illustration at 46, these trigger points represent points along the spacetime trajectory when the aircraft will reach the threat response margin for which evasive or recovery action should be initiated.

It is worth emphasizing again that the generated projected trajectories represent different hypothetical trajectories that the pilot (or an automated system) might elect to follow. Because each of these trajectories is being continually generated, they all represent possible future states of the aircraft. The current state of the aircraft lies at the starting point or singularity from which the projected future trajectories diverge. So long as there are plural projected trajectories available, the pilot remains free to follow whatever course he or she desires. Whatever course the pilot elects to fly, the processor 10 merely re-computes its solutions for the predetermined future trajectories.

Deprecating Projected Trajectories that are not Viable

As the aircraft continues to fly, and as the projected trajectories are continually recomputed, there may be instances where a given trajectory becomes no longer viable. This can happen, for example, when the aircraft lacks sufficient energy to perform the projected trajectory maneuver, or when the projected trajectory maneuver will violate a speed limit which could potentially damage the aircraft or violate local speed limit laws. This can also happen if the projected trajectory places the aircraft on a collision course with a material object with a momentum sufficient to damage the aircraft. The processor 10, at step 48, evaluates each of the projected trajectories on this basis, and decommissions or deprecates any trajectory that is no longer viable. In FIG. 1 at 50, two of the projected trajectories are shown in dotted lines to indicate that they have been deprecated.

Trajectories that have been deprecated are not used in a subsequent protective response. However, because the trajectory solutions are continually being updated by the processor, a deprecated trajectory could return to viability if the condition that caused it to be deprecated is lifted. For example if a trajectory was deprecated because it put the aircraft on collision course with another aircraft, and the other aircraft has since moved out of collision range, the processor will reinstate that trajectory as viable by removing its deprecation state.

Initiating a Protective Response

As illustrated at 52, if the processor reaches a state where only one viable trajectory remains (all others have been deprecated), the processor initiates a protective response. This response can include sending a warning or alert message to the pilot, which the pilot may heed or not. Whether heeded or not, the protective response initiated by the processor is designed to set the aircraft on a computed trajectory that will avoid or escape from the first-encountered threat (if plural threats lie on the computed trajectory). To accomplish this the processor sends one or more commands to an autopilot system, the details of which will be discussed below.

Figure 5:
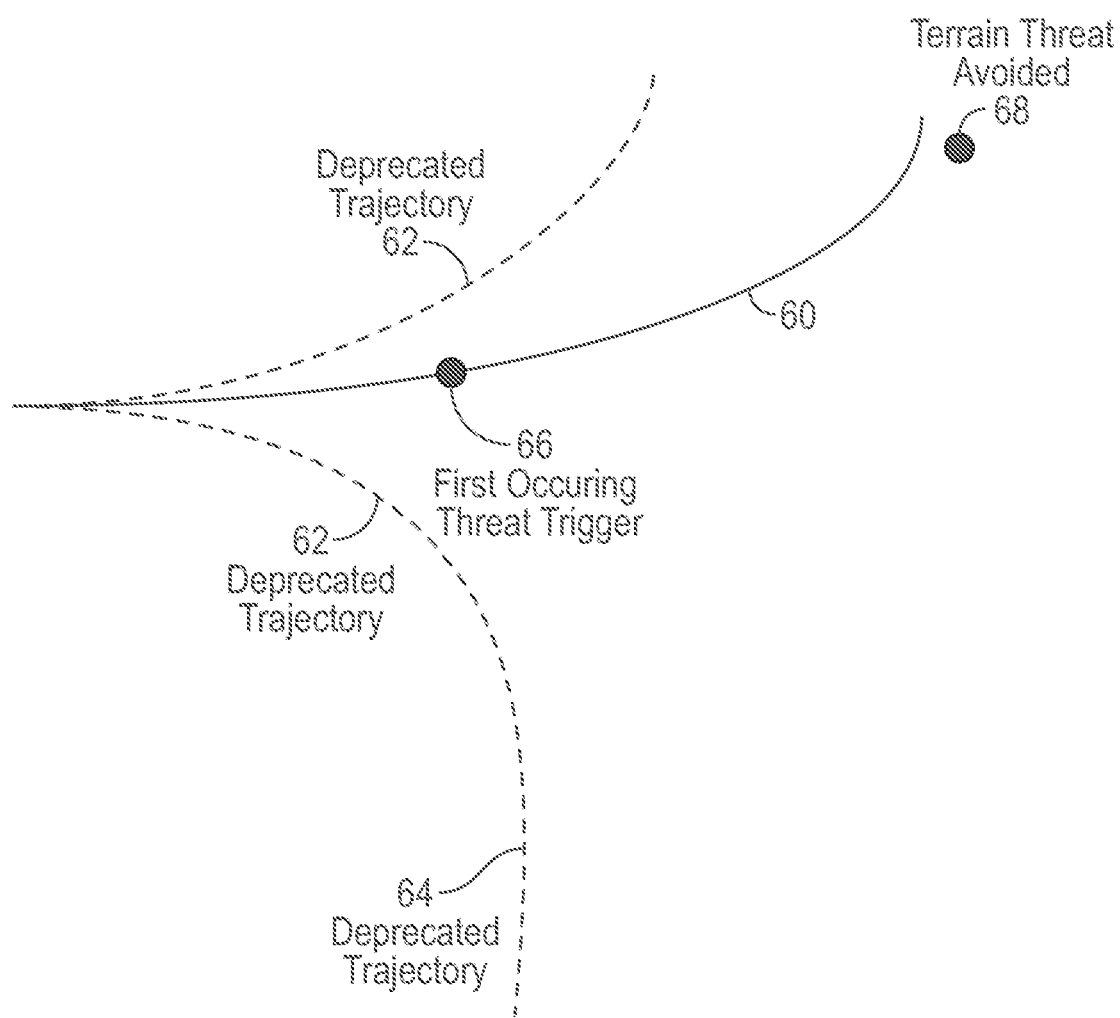
FIG. 5 is a detailed view of one viable and two deprecated trajectories, illustrating how the first-encountered trigger is used to initiate an aircraft protective response.

FIG. 5 illustrates this important hazard recovery response protocol in greater detail. As shown, one trajectory 60 remains viable, while trajectories 62 and 64 have been deprecated. Along the viable trajectory 60, the first-occurring threat 66 triggers the protective response to be initiated. When initiated, the aircraft flies according to the projected trajectory. In effect the projected trajectory becomes the actual trajectory instance that the aircraft will fly, subject to later changes (if any) from a subsequent iterative update of the projected trajectory. When triggered by the first occurring threat at 66 (which could be for example, a speed violation due to a nose-low condition), the recipe used to compute the shape of the projected trajectory also avoids the terrain threat at 68.

Kinematic-Energy Model

The presently preferred, minimal set of fundamental variables used by processor 10 relies upon a kinematic-energy model that defines a predictive trajectory in terms of the aircraft's physical position, its energy state, and the forces acting on the aircraft that affect trajectory. In this regard forces normal to the aircraft's longitudinal axis (normal forces) change the trajectory direction, while forces tangential to the aircraft's longitudinal axis (tangential forces) change the aircraft's velocity along that trajectory.

Figure 2:
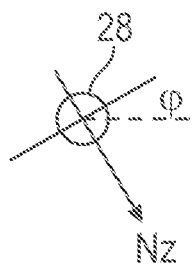
FIG. 2 is a schematic representation of an aircraft, useful in understanding certain force vectors and angles used by the disclosed common schema and kinematic-energy models.

In one embodiment the common schema for the n-dimensional threat space can be represented by a minimal set of fundamental variables, $N_z$, $\phi$, $P_s$ and $\gamma$. As shown in FIG. 2, $N_z$ represents the normal force (force acting normal or perpendicular to the longitudinal axis of the aircraft). In FIG. 2, the longitudinal axis of the aircraft 28 is directed into the page. This normal force $N_z$ also represents the g-force acting on the aircraft. When the aircraft is flying in a level, steady state condition, the g-force acting on the aircraft is the force of gravity. However, when the aircraft is flying with a non-zero bank angle it, the g-force orientation is changed.

Figure 3:
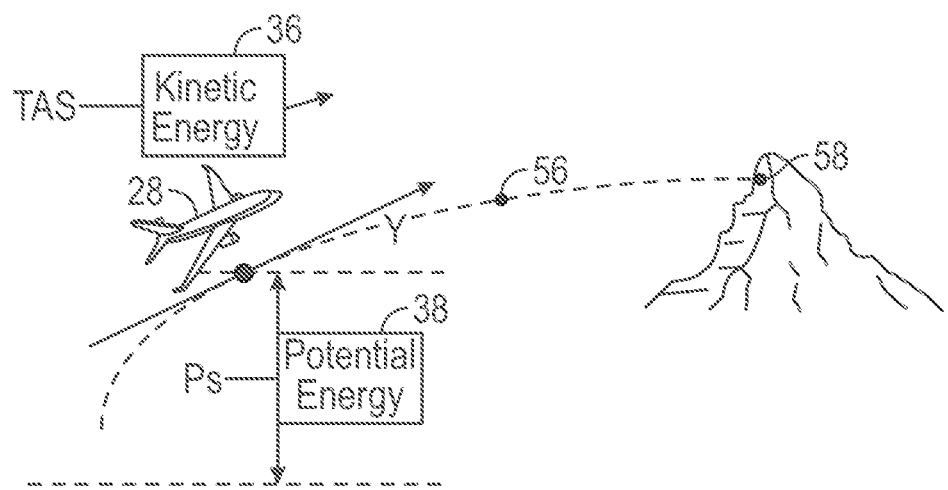
FIG. 3 is a schematic representation of an aircraft, useful in understanding certain energy values used by the common schema and kinematic-energy models, and also showing a projected trajectory with exemplary energy and matter threats.

Illustrated in FIG. 3, the energy state of the aircraft 28 comprise two components: kinetic energy 36, related to the velocity of the aircraft ($KE=\frac{1}{2} mv^2$ where m is aircraft mass and v is velocity), and potential energy 38, the energy available to produce acceleration. The potential energy includes an aircraft altitude component—potential energy increases with altitude ($PE=mgh$ where m is aircraft mass, h is aircraft altitude and g is the gravitational constant)—and a portable stored energy component representing the amount of additional thrust that can be developed by increasing the power output of the engines. While there are many measurable variables that can be used to calculate the kinetic and potential energy of the aircraft, in one embodiment the kinetic energy 36 is derived from the true air speed (TAS); the potential energy 38 is derived from the aircraft altitude, specific excess power $P_s$ (available thrust power minus drag power) and the flight path angle γ. The specific excess power $P_s$ is normalized to be independent of the aircraft weight, making $P_s$ a weight-independent energy term. A value $P_s=0$ signifies that there is no excess power available, meaning every bit of power is simply overcoming the drag. In the $P_s=0$ condition, the aircraft can still accelerate by flying nose down, or can still decelerate by flying nose up. This effect is accounted for by the γ term, which represents the flight path angle (nose-up, nose-down angle). When a non-zero γ angle is invoked, kinetic energy and potential energy are exchanged: a nose-up γ angle gives up some kinetic energy to increase potential energy; conversely, a nose-down γ angle gives up some potential energy to increase kinetic energy.

Figure 4:
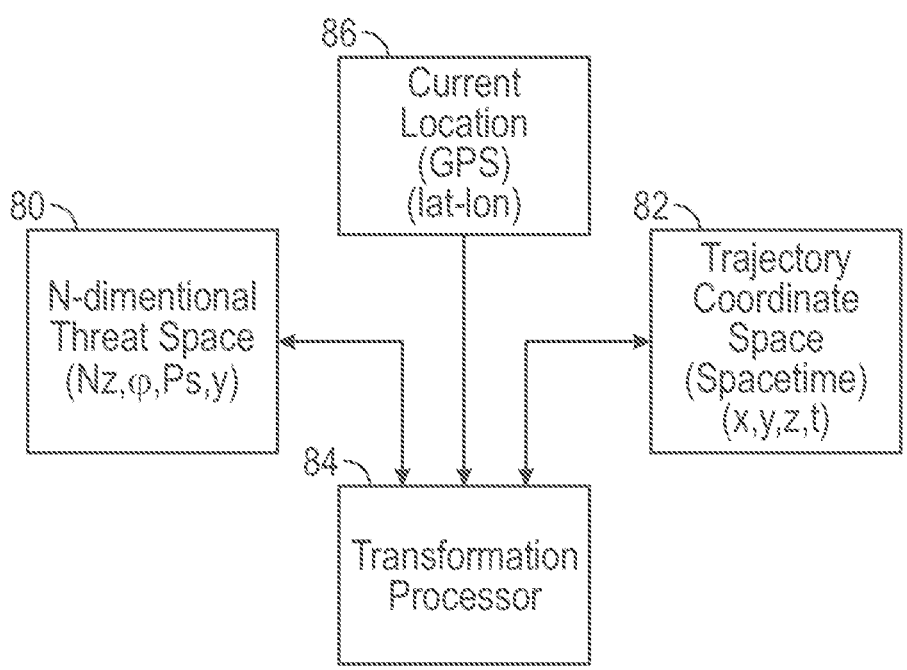
FIG. 4 is a data model block diagram showing the relationship between the n-dimensional threat space and the trajectory coordinate space (spacetime)

These variables may be used both to represent threats within the n-dimensional threat space 80, shown in FIG. 4 and may also be used to calculate the aircraft's position and energy state at future positions in spacetime along a projected trajectory by using kinematic-energy relationships to transform data between the n-dimensional threat space 80 and the trajectory coordinate space 82. The kinematic-energy relationship transformations are performed by the transformational processor 84, which may be implemented by programming processor 10 with the kinematic-energy relationships that relate aircraft $P_s$, $N_z$, φ, and γ threat space values to the aircraft trajectory coordinates in spacetime (x, y, z, t).

The disclosed predictive aircraft threat envelope protection system is able to provide full envelope protection because of its unique data model that can represent all threats using a common schema employing a minimal set of fundamental variables. As illustrated in FIG. 4 the disclosed threat envelope protection system, in essence employs a kinematic-energy data model based on a minimal set of variables and processor component that ties key components of the data model together. One key component of the data model defines the n-dimensional threat space 80 by which all threats are representing using a pair of force variables (Nz, φ)) and a pair of energy state variables (Ps, γ). The threats to be protected against that are known a priori are pre-populated into the threat envelope data structure 22 (FIG. 1). Threats known a priori would include, for example threats relating to different energy limits, such as stall limits, overspeed limits and under-speed limits. Some of these limits are known at the aircraft design time, while other limits are calculated during flight.

Another key component of the data model defines the trajectory coordinate space in terms of spacetime variables (x, y, z, t). Some threats, such as terrain objects and other aircraft (both examples of physical matter that occupy space) in the vicinity are more readily represented in coordinate space, based on the object's position. For example the system may utilize map data to store the physical location of terrain structures such as mountains that may be encountered during flight. The system is able to model both energy threats and matter threats. To illustrate, in FIG. 4 two threats lie on the aircraft trajectory, an energy threat 56 (which could be, for example, an aircraft stall limit) and a matter threat 58 (which could be a terrain object, such as a mountain).

To tie these two data model components together, processor 10 (FIG. 1) is programmed with the necessary kinematic equations to function as a transformation processor 84 that uses the current aircraft location 86, obtained from suitable sensor such as GPS, and the force variables and energy state variables within threat space 80, to calculate the projected trajectories in trajectory coordinate space 82. If needed, the transformation processor can also project points in trajectory coordinate space 82 into threat space 80, to assess for example whether the current or projected future location of the aircraft intersects with envelope threat limits.

Full-Envelope Protection

Full envelope protection provided by the disclosed aircraft flight envelope protection system involves two related aspects: (1) the protection afforded by the disclosed system covers all circumstances, not just the most common hazards; and (2) the disclosed system handles plural different threat conditions concurrently. It is not limited to a singular threat. To illustrate the first aspect, the system is designed to provide protection in all circumstances not just in the heart of the flight envelope or for the most common hazards. For example, a conventional overspeed protection system only works while near wings level. At very high bank angles, the overspeed protection is suppressed. The reason for this is logical. The overspeed protection works by pulling the nose up to help slow the aircraft. If the aircraft was at a very high bank angle, inverted for example, pulling the nose up can exacerbate the problem instead of alleviating it. The full envelope protection afforded by the disclosed system does not have such limitations and works across the entire spectrum of aircraft flight conditions.

To illustrate the second aspect, the system is designed to provide full protection against all threats not just a single threat. In a conventional terrain awareness warning system (TAWS), for example, protection is provided against ground impact. Low speed protection—however—is not provided. Instead, a separate low-speed protection system is conventionally provided. In contrast, the disclosed aircraft flight envelope protection system provides protection against all threats in a single system. Handling all threats in a single system avoids conflicts that can arise with a collection of federated systems.

To illustrate, there have been mishaps involving aircraft equipped with TAWS and low speed protection that have hit the ground at slow speed. The problem is that federated systems are not cognizant of other systems assumptions. In the example case, the aircraft was flying at a slow speed, but the low speed protection was not triggered because the speed was not close to stall, although the speed was slow enough to prevent an immediate climb. The ground proximity system was not triggered because the aircraft was on descent to a runway and the system assumed that climb capability existed. Neither system was aware of the other system's proximity to a threat and the assumptions that the other systems made regarding speed and altitude. The disclosed aircraft flight envelope protection system provides a seamless comprehensive system that provides protection against all threats with full awareness of all relevant parameters.

Multi-Trajectory

The disclosed predictive system is a multi-trajectory system that in one preferred embodiment uses three primary trajectories to predict a warning/recovery initiation time. Another embodiment, capable of recovery from aircraft inverted (upside-down) conditions, uses six primary trajectories. Before discussing multiple trajectories, first consider a single predictive trajectory system and how that would be implemented into a warning system. For a single predictive trajectory system, the system would look at current state and then assume a recovery would be initiated at that moment.

The predictive recovery would then be modeled and tested for proximity to protected threats. For example, if the aircraft were in a dive toward the ground, the system would predict what the nose low recovery would look like and test that trajectory for proximity to both airspeed limits and terrain. If no limits were exceeded and the margins were acceptable, no warning would be issued. If limits were exceeded or margins unacceptably small, a recovery warning would be triggered "PULL-UP" for example. In many cases, a single trajectory is sufficient. In the nose low case against flat terrain, there is really only one good way to recovery and that is to roll wings level, reduce power and pull to recovery Nz until clear of the terrain and airspeed limits.

The reason for supporting plural predictive trajectories (e.g., six trajectories in one preferred embodiment) can be illustrated by a second example in which the aircraft is flying level toward a single butte in the desert. In such a case, there are two predictive trajectories that might be used. The pilot could avoid the butte by turning left or right to avoid it, or by staying on course and climbing above it. This raises the question, at what point should the system initiate a "PULL UP" warning? Perhaps not at all if a level turn is best. The solution to this problem is to use multiple trajectories. Since the pilot has multiple escape options, the system models each of those options. In the butte example, the system would model three trajectories, a left turning trajectory, a right turning trajectory, and a climbing trajectory. If a single trajectory violates a limit or has insufficient margins but the others are clear, no warning is issued as the pilot still has margin for another option. A warning is only issued when there is only one viable trajectory and that trajectory reaches a trigger point. So in the butte example, if the left and right turn are ruled out, a "PULL UP" will be issued when the climbing trajectory margins fall below a desired threshold. If due to a different approach or type of terrain, the climbing trajectory is ruled out, a "TURN LEFT" or "TURN RIGHT" warning will be issued when the respective trajectory is the last available and has reached its trigger margin.

Automatic

The predictive aircraft flight envelope protection system is a fully automatic system, which means that it does not rely on pilot intervention. While it can provide and probably should provide a warning to the pilot, the system is automatic and not dependent on the pilot heeding that warning to provide protection. This requires a few additional considerations. First, we need a system to give effect to the predictive warning. An auto-pilot of some form needs to be implemented that executes an envelope protecting maneuver. That auto-pilot should have full authority over roll and pitch as well as speedbrake and throttle. Further, since the system must operate in one-engine-inoperative (OEI) cases, the auto-pilot must be able to handle asymmetric thrust conditions. The solution provided by the disclosed system is to add thrust compensation into the basic aircraft control laws. As a result, even when an avoidance is not in progress, the aircraft behaves as if the thrust lines of both engines were along the centerline of the aircraft. In a one embodiment, the N1 difference between engines is used to schedule compensating rudder. There are other recognized methods of thrust compensation that can be used as an alternative to N1.

A second necessary feature of an automatic system is that it must be much more resistant to failures and corrupted sensors than a manual system. With a manual system, the false warning can be easily ignored. With an automatic system, it cannot be ignored and therefore the resistance to false warnings must be significantly higher. The disclosed system thus provides multiple-redundant sensors combined with monitor circuits that determine when a sensor has failed or is suspect, and voter circuits that determine what sensor value is reported to the system when there is some variation between the multiple-redundant sensors.

Finally, the automatic system allows pilot input to be blended with the control provided by the system. In previous systems of this nature (e.g., legacy automatic ground collision avoidance systems used in military applications), the recovery is typically always nearly the maximum capability of the aircraft. The reasons for this derive from performance required for military applications, where nuisance free extreme low level operation (nape of the earth operation) was required without regard to ride quality. In a business jet, the opposite is true. Extreme low level, nape of the earth operations are not required and ride quality for passengers is of paramount importance. As a result, the preferred recovery for a business jet is typically nowhere near the maximum performance capability of the aircraft.

The smooth, passenger comfortable recovery does create challenges, however. First, during upsets when a jet wake flips an aircraft upside down or a wind shear throws the aircraft toward the ground, a smooth, passenger comfortable recovery will not suffice. In these extremely rare "Act of God" cases, it is irrelevant how the aircraft got there; it is paramount to recover the aircraft, using all available control power. Second, there are instances where an automatic recovery initiates but during the recovery, the pilot becomes aware of how close to the ground he really is and wishes to increase the terrain margin by increasing performance of the recovery. In this case, the system will permit the pilot to increase recovery aggressiveness by blending pilot input with the calculated smooth, passenger comfortable recovery. Thus the system flexibly handles the extremes where the smooth, passenger comfortable recovery may not be appropriate: in one case allowing the system to automatically increase recovery aggressiveness, and in another case allowing the pilot to do so. To address these cases, the system implements a non-binary control system that will be described next.

Non-Binary

In a binary system, the auto-recovery or warning is either on or off, there are no middle states. As mentioned previously, the disclosed automatic system designed for business jet requires more. The solution is a non-binary system. In the disclosed system, the smooth, passenger comfortable soft ride is used but pilot blending is allowed and the soft ride will automatically blend into a harder and harder recovery if the margins degrade or fail to improve. One way to accomplish this is by comparing the soft ride preferred trajectory to the hard ride trajectory in the same direction and blending a nudger/fader based on that comparison. Other methods can be used where the margins to the limits can be used to drive the blending. For example, the processor can assess if a smooth ride fails to achieve the margins desired. In such case the trajectory predicting algorithm incrementally increases aggressiveness and directs an increasingly more aggressive recovery in response. The nudger/fader design should be built such that pilots can aid the recovery but are progressively prevented from degrading the recovery when margins are small.

Pilot Alerting

Time To Go or Time Available is the amount of time the pilot could delay the recovery before a recovery must be initiated to avoid violating a threat limit. In the example provided, the "time to go" value is computed with regards to a defined hazard. There can be multiple defined hazards and therefore multiple computed "time to go" values for a predicted trajectory.

For every defined hazard, every trajectory computation tracks the minimum margin to that hazard and the maximum rate of change of margin towards that hazard over the course of the trajectory. The "time to go" is calculated by dividing the minimum margin to the hazard by the maximum rate of change of margin towards the hazard. As used herein, a positive margin is a case where there is no limit violation and a negative margin is a case where there is a limit violation. Likewise, an approach to a limit as a positive rate of change toward that limit. It should be appreciated that the sign convention used may be altered without departing from the scope of the present disclosure.

If the minimum margin term is less than or equal to zero, a violation of a limit is predicted and an alternative form of representing the TTG (which would be a negative value) is necessary. In some embodiments, TTG is set to a negative value proportional to the magnitude of the limit violation. Upon every completion of a predicted trajectory, the minimum margin to a hazard and the maximum rate of change of margin towards a hazard are updated, thereby updating the "time to go."

Figure 6:
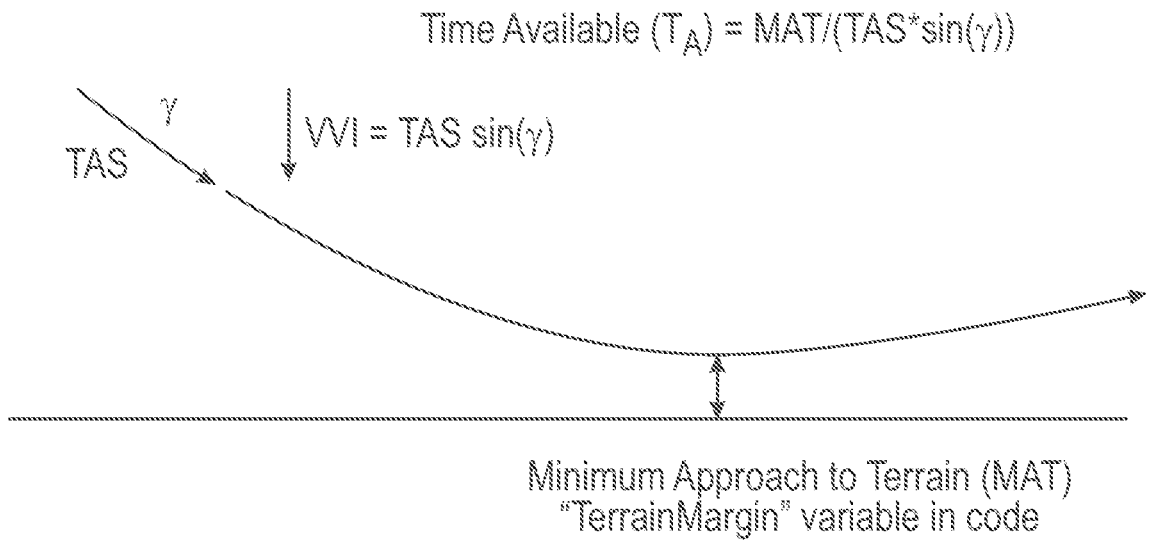
FIGS. 6-8 are schematic representations of potential aircraft time available calculation scenarios.
Figure 7:
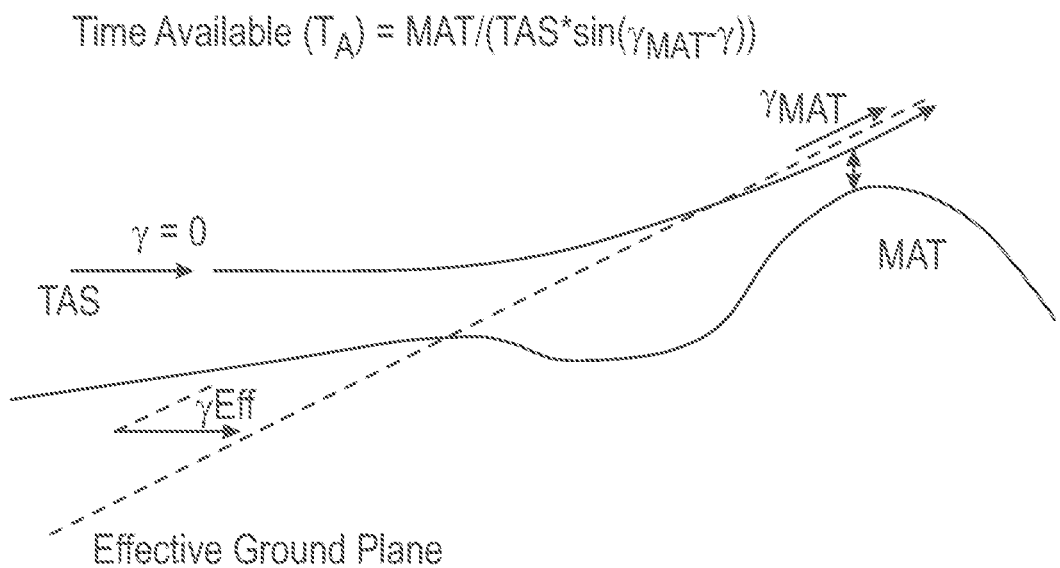

In some embodiments, time available before impinging on a limit can be computed simply by dividing the closest approach to that limit by the rate at which you are approaching the limit. For terrain that would be described by the diagram in FIG. 6. Over level terrain, the method illustrated in FIG. 6 works well. You simply take the minimum altitude and divide it by the vertical velocity at initiation (VVI) to compute the time available. However, over rough terrain this method may be modified as illustrated in FIG. 7. In some embodiments, the methods described with reference to FIG. 6 and FIG. 7 are used in addition to the method described in FIG. 9. For example, the method of FIGS. 6-7 may be used when calculating a time to go for terrain and the method of FIG. 9 may be used for other threats (VMAX, VMIN, etc.). In some embodiments, the time to go for all threats uses the same method selected from FIG. 6, FIG. 7, or FIG. 9.

Because the closest approach to terrain can occur while still in a descent or even after achieving a positive climb rate, simply looking at the initial rate of descent will not suffice. The solution is to look at the initial rate of approach to the minimum altitude plane. This is illustrated in FIG. 7. To compute Time Available over rough terrain, compute the effective vertical velocity based on the relationship between initial flight path angle (gamma) and ending flight path angle (gamma$_{MAT}$).

This approach determines Time Available by looking at how close to the limit you are and what your rate toward that limit is at the beginning of the trajectory. For simple trajectories, this approach is more than adequate. In some complex trajectory scenarios, however, additional steps should be considered. For example, in the case where and aircraft is nose high but at a very high bank (e.g., 120 degrees) the aircraft will recover by rolling wings level. In so doing, the aircraft climb attitude will drop substantially and a nose low recovery will be required once the bank angle is corrected. The primary concern here is that the aircraft will overspeed and/or hit the ground prior to completing the nose low recovery. So, despite being nose high at the start of the trajectory, the primary threat is ground collision and overspeed. If we predict this trajectory and find it gets very close the ground or overspeed, how do we compute the Time Available? If we use the methods described above, we will get grossly invalid results. Looking at ground collision for example, at the beginning of the trajectory, we are climbing so our vector is actually away from the terrain. A negative vector will yield an infinite Time Available using the previous method. Suppose we were to roll the aircraft a little more, say to 180 degrees bank. At this new roll attitude, we no longer can recover in time to avoid ground impact. But again, our initial vector is away from the ground we are predicted to hit, so additional steps should be taken.

One solution is to simply re-run the trajectory prediction over again using increasing recovery delay times until the trajectory is no longer viable. The recovery delay time at which the trajectory is no longer viable would then be the Time Available. Unfortunately, such re-calculating would be a huge computational burden. Another solution is to run the trajectory again just once more using a fixed delay (e.g., 2 seconds) and looking at the margins with a two second delay. If that delay makes things better (larger margins), then Time Available is large. If things get worse over those two seconds, the time available can be estimated by looking at the rate of closure to the limit as before, but instead of using the rate of closure of the aircraft itself at the beginning of the trajectory, the method uses the rate of closure from the no delay trajectory to the 2 second delay trajectory.

In some embodiments, the system uses alternative methods when the recovery chosen by the TPA does not use the maximum performance available from the aircraft and the pilot is maneuvering the aircraft more aggressively than the recovery would be. For example, if an F-16 system used a 5 g recover but the pilot was doing a diving recovery at 8 gs, the methods described above will conclude that Time Available was infinite. At time zero, there is a vector toward the ground and the 5 g recovery will just barely miss the ground. The Time Available to execute that 5 g recovery is small. If the pilot is maneuvering at 8 gs, however, and the pilot delays 2 seconds, the aircraft will miss the ground by a larger margin than it would have if the aircraft recovered immediately at 5 gs. This is because the pilot is outperforming the auto-recovery during the delay. The methods above indicate that things are getting better with the 2 second delay and the time available is infinite. While true that if the pilot keeps maneuvering at 8 gs the aircraft is not in danger, the pilot does not necessarily have large margins.

In some embodiments, the methods above are utilized and if the delayed recovery indicates approaching danger to use that value. However, if the delayed recovery indicates improved clearance, use the previous method. Another solution would be to run the trajectory with a delay but restrict the current conditions to the maximum used by the auto-recovery so that you cannot out-perform the recovery during the delay. This has some complications of its own. For example, high roll rates can sometimes help but can also hurt. In some embodiments, the system simply extrapolates the current position and roll attitude for 2 seconds before running the trajectory prediction.

Figure 8:
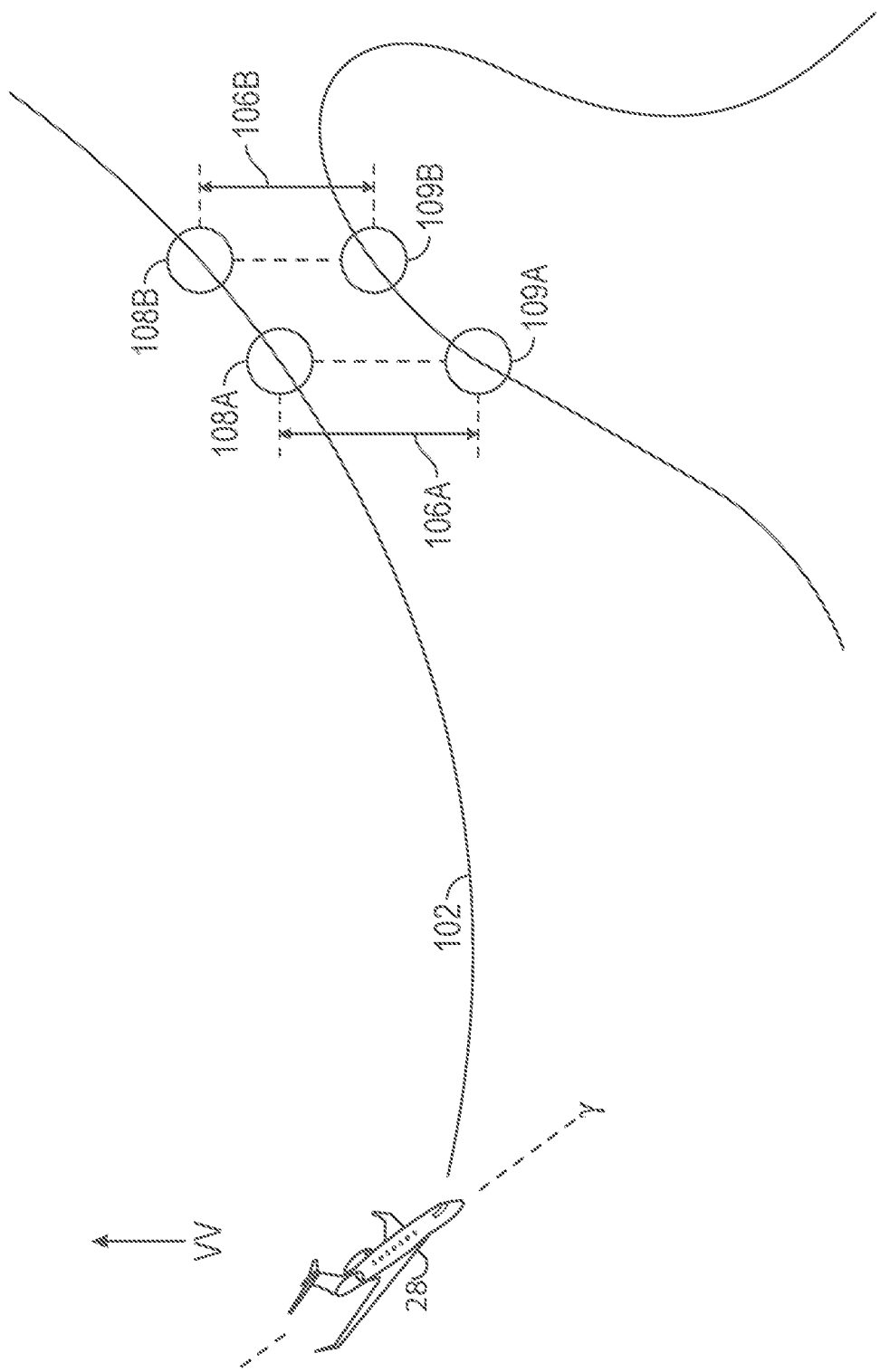

Referring now to FIG. 8, and with continued reference to FIGS. 1-7, aircraft 28 is illustrated along with a last viable (non-deprecated) trajectory 102. Processor 10 calculates a plurality of future trajectory points including a first trajectory point 108A and a second trajectory point 108B. The ordinals "first" and "second" are used to for clarity of explanation, and in no way imply an order of computation relative to other points computed along trajectory 102. Each of trajectory points 108A-B exists at an altitude (ALT) and is associated with projected aircraft state variables, as discussed above.

A difference between a respective terrain height 109A, 109B and the projected trajectory point 108A-B along trajectory 102 is the margin 106A, 106B existing between the aircraft's projected position and the threat. The example provided illustrates a terrain conflict as the hazard/threat for ease of explanation, but the algorithm used to calculate the time to go also applies to other threats. For example, the threat for terrain is illustrated as a height limit, whereas the threat for overspeed protection is a maximum speed value indicated by aircraft design limits at a given altitude, as will become apparent below.

Figure 9:
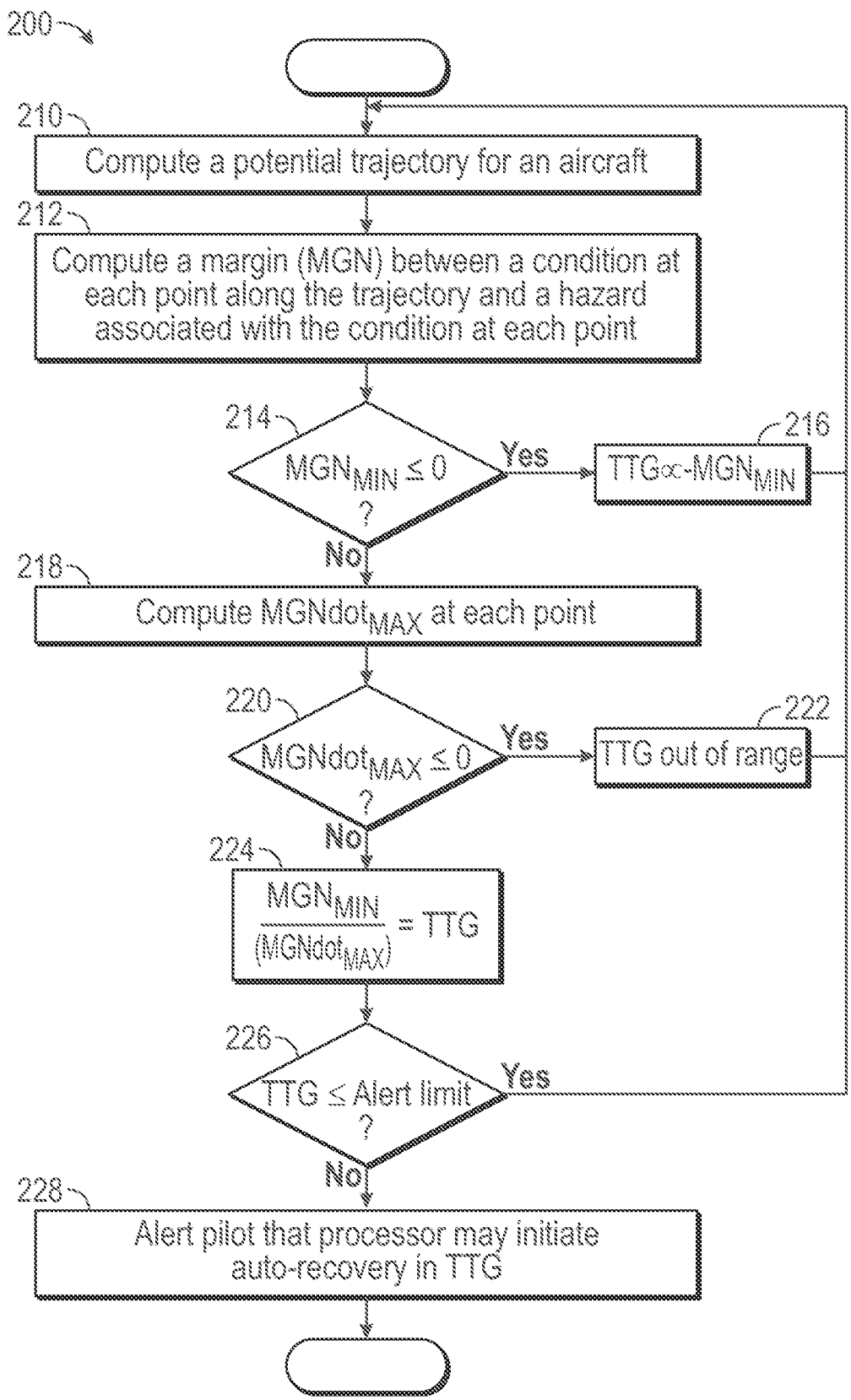
FIG. 9 is a flowchart and illustrating a method for alerting a pilot to a potential auto-recovery of an aircraft.

Referring now to FIG. 9, and with continued reference to FIGS. 1-8, a method 200 of alerting a pilot of an impending auto-recovery initiation is illustrated. In the example provided, processor 10 performs the tasks of method 200.

Task 210 predicts an aircraft state at each of a plurality of positions along a potential future trajectory available to the aircraft. For example, processor 10 may compute any of potential trajectories 60, 62, 64, or 102. In the example discussed with reference to method 200, processor 10 is predicting aircraft 28 will be at trajectory point 108B at a currently computed time position t along trajectory 102 and will be at trajectory point 108A at previously computed time position t-1 along trajectory 102.

Task 212 calculates a margin value (MGN) at each of the plurality of positions as a difference between the predicted future condition and the threat value at each respective one of the plurality of positions. In the example provided, threat data structure 22 stores an alert threshold at which processor 10 should alert the pilot of potential auto-recovery. Threat data structure 22 also stores a margin threshold below which the avionics system will engage an autopilot recovery of the aircraft. The margin threshold indicates a permissible margin limit between the predicted future condition at point 108 and the hazard/threat value at terrain height 109.

Task 216 sets time to go (TTG) as $MGN_{MIN}$ in response to task 214 determining that $MGN_{MIN}$ is greater than or equal to zero.

Task 218 calculates a margin rate of change (MĠN) at each of the plurality of positions based on a change in the margin value along the potential future trajectory. $MGN_{MIN}$ and $MĠN_{MAX}$ are calculated for each of a plurality of potential future trajectories independent of each other of the plurality of potential future trajectories. For example, trajectory 102 has $MGN_{MIN}$ and $MGṄdot_{MAX}$ values that are separate from those calculated for potential trajectories 60, 62, 64. In the example provided, MĠN at each of the plurality of positions is calculated according to:

$$MGNdot = \frac{MGN_i - MGN_{i-1}}{t_i - t_{i-1}},$$

where i is a current position of the plurality of positions and t is a time variable projected ahead of the aircraft along the potential future trajectory. The time variable t refers to the previous time slice in the predicted time frame along the potential trajectory, and is not associated with a real time frame associated with the actual flight of the aircraft. For example, when t is 100 seconds, processor 10 is at the point of the iterative computations where processor 10 is computing where aircraft 28 is projected to be in 100 seconds from the current real time.

Task 222 sets TTG as out of range in response to task 220 determining that $MĠN_{MAX}$ is less than or equal to zero.

Task 224 estimates the time to go (TTG) value based on the minimum calculated margin value ($MGN_{MIN}$) and the maximum calculated margin rate of change ($MĠN_{MAX}$) among the plurality of positions. In some embodiments, $MGNdot_{MAX}$ is calculated based on at least one of: a change in the margin value along the potential future trajectory at each of the plurality of positions, a rate of change of a current value of the condition at the start of the prediction, or a rate of change of the condition at the start of the prediction less the rate of change of the limit at each of the plurality of positions. In the example provided, processor 10 calculates TTG according to:

$$\frac{MGN_{MIN}}{(MGNdot_{MAX})} = TTG.$$

Task 226 determines whether TTG is less than or equal to the alert threshold. When TTG is less than the alert threshold, processor 10 alerts the pilot that processor 10 may initiate auto-recovery in the time indicated by TTG at task 228.

In the system described herein, processor 10 makes the determination about when to initiate the auto-recover without regard to the amount of time the pilot has been given before the initiation. For example, processor 10 may initiate the recovery when margin 106A or 106B is below the margin threshold no matter how long the indicator has been alerting the pilot.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. An avionics system for an aircraft, comprising:
    a memory circuit including a threat data structure storing an alert threshold and a margin threshold below which the avionics system will engage an autopilot recovery of the aircraft, the margin threshold indicating a difference limit between a predicted future condition and a threat value, and the alert threshold indicating a predetermined amount of time the avionics system would preferably alert a pilot before engaging an autopilot; and
    a processor coupled to the memory circuit, the processor programmed to:
        predict an aircraft state at each of a plurality of positions along a potential future trajectory available to the aircraft;
        calculate a margin value (MGN) at each of the plurality of positions as a difference between the predicted future condition and the threat value at each respective one of the plurality of positions;
        calculate a margin rate of change (MGNdot) along the potential future trajectory;
        estimate a time to go (TTG) value based on a minimum calculated margin value ($MGN_{MIN}$) and a maximum calculated margin rate of change ($MGNdot_{MAX}$) among the plurality of positions; and command an indicator to alert the pilot in response to the time to go value reaching the alert threshold.

2. The avionics system of claim 1, wherein the processor is programmed to calculate MGNdot based on at least one of:
a change in the margin value along the potential future trajectory at each of the plurality of positions;
a rate of change of a current value of the condition at the start of the prediction;
a rate of change of the condition at the start of the prediction less the rate of change of the limit at each of the plurality of positions.

3. The avionics system of claim 1, wherein the processor is further programmed to set TTG to a negative value equal to a proportion of $MGN_{MIN}$ in response to determining that a predicted limit violation has occurred.

4. The avionics system of claim 3, wherein the processor is further programmed to set TTG as out of range in response to $MGNdot_{MAX}$ being less than or equal to zero.

5. The avionics system of claim 1, wherein the processor is further programmed to calculate TTG according to:

$$\frac{MGN_{MIN}}{(MGNdot_{MAX})} = TTG.$$

6. The avionics system of claim 5, wherein the processor is further programmed to calculate MĠN and $MĠN_{MAX}$ for each of a plurality of potential future trajectories independent of each other of the plurality of potential future trajectories.

7. The avionics system of claim 1, wherein the processor is further programmed to calculate MGNdot at each of the plurality of positions according to:

$$MGNdot = \frac{MGN_i - MGN_{i-1}}{t_i - t_{i-1}},$$

where i is a current position of the plurality of positions and t is a time variable projected ahead of the aircraft along the potential future trajectory.

8. An aircraft, comprising:
a memory circuit including a threat data structure storing an alert threshold and a margin threshold below which the avionics system will engage an autopilot recovery of the aircraft, the margin threshold indicating a difference limit between a predicted future condition and a threat value, and the alert threshold indicating a predetermined amount of time the aircraft would preferably alert a pilot before engaging an autopilot; and
a processor coupled to the memory circuit, the processor programmed to:
predict an aircraft state at each of a plurality of positions along a potential future trajectory available to the aircraft;
calculate a margin value (MGN) at each of the plurality of positions as a difference between the predicted future condition and the threat value at each respective one of the plurality of positions;
calculate a margin rate of change (MGNdot) along the potential future trajectory;
estimate a time to go (TTG) value based on a minimum calculated margin value ($MGN_{MIN}$) and a maximum calculated margin rate of change ($MGNdot_{MAX}$) among the plurality of positions; and
command an indicator to alert the pilot in response to the time to go value reaching the alert threshold.

9. The aircraft of claim 8, wherein the processor is further programmed to engage the autopilot without regard to the time to go value and the alert threshold.

10. The aircraft of claim 8, wherein the processor is further programmed to set TTG to a negative value equal to a proportion of $MGN_{MIN}$ in response to determining that a predicted limit violation has occurred.

11. The aircraft of claim 8, wherein the processor is further programmed to set TTG as out of range in response to $MGNdot_{MAX}$ being less than or equal to zero.

12. The aircraft of claim 8, wherein the processor is further programmed to calculate TTG according to:

$$\frac{MGN_{MIN}}{(MGNdot_{MAX})} = TTG.$$

13. The aircraft of claim 8, wherein the processor is further programmed to calculate MĠN and $MĠN_{MAX}$ for each of a plurality of potential future trajectories independent of each other of the plurality of potential future trajectories.

14. The aircraft of claim 8, wherein the processor is further programmed to calculate MĠN at each of the plurality of positions according to:

$$MGNdot = \frac{MGN_i - MGN_{i-1}}{t_i - t_{i-1}},$$

where i is a current position of the plurality of positions and t is a time variable projected ahead of the aircraft along the potential future trajectory.

15. A method of alerting a pilot to an impending auto-recovery by an avionics system of an aircraft, the method comprising:
predicting an aircraft state at each of a plurality of positions along a potential future trajectory available to the aircraft;
calculating a margin value (MGN) at each of the plurality of positions as a difference between a predicted future condition and a threat value at each respective one of the plurality of positions;
calculating a margin rate of change (MGNdot) along the potential future trajectory;
estimating a time to go (TTG) value based on a minimum calculated margin value ($MGN_{MIN}$) and a maximum calculated margin rate of change ($MGNdot_{MAX}$) among the plurality of positions; and
commanding an indicator to alert the pilot in response to the time to go value reaching the alert threshold.

16. The method of claim 15, further comprising engaging the autopilot without regard to the time to go value and the alert threshold.

17. The method of claim 15, further comprising setting TTG to a negative value equal to a proportion of $MGN_{MIN}$ in response to determining that a predicted limit violation has occurred.

18. The method of claim 17, further comprising setting TTG as out of range in response to $MĠN_{MAX}$ being less than or equal to zero.

19. The method of claim 15, further comprising calculating TTG according to:

$$\frac{MGN_{MIN}}{(MGNdot_{MAX})} = TTG.$$

20. The method of claim 15, further comprising calculating MGNdot at each of the plurality of positions according to:

$$MGNdot = \frac{MGN_i - MGN_{i-1}}{t_i - t_{i-1}},$$

where i is a current position of the plurality of positions and t is a time variable projected ahead of the aircraft along the potential future trajectory.

\* \* \* \* \*